W. L. PAUL.
PLOW.
APPLICATION FILED JUNE 11, 1910.
1,004,463.
Patented Sept. 26, 1911.
2 SHEETS—SHEET 2.
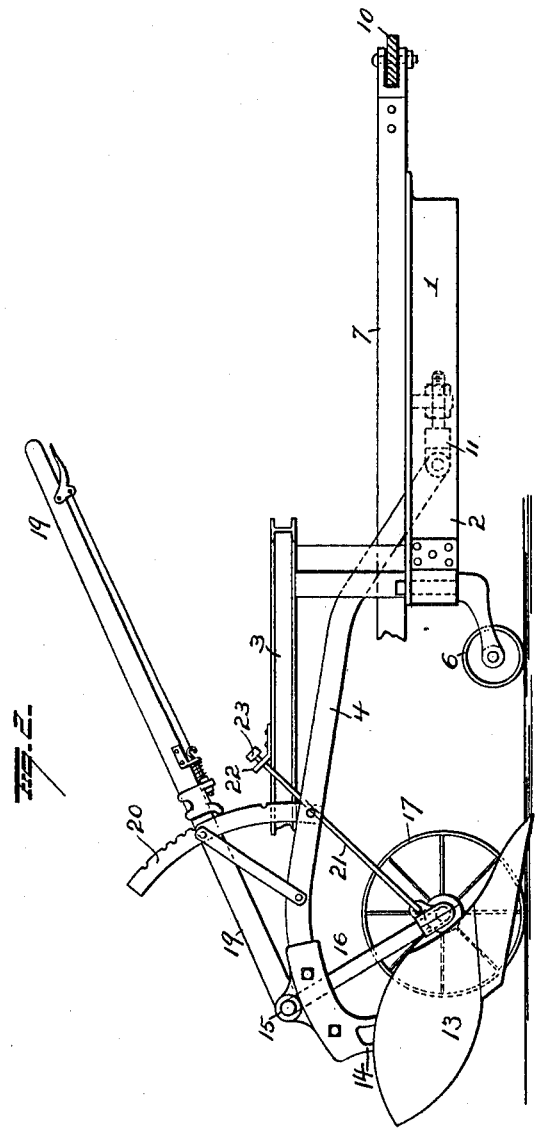
WITNESSES
INVENTOR
W. L. Paul
By H. A. Seymour
Attorney

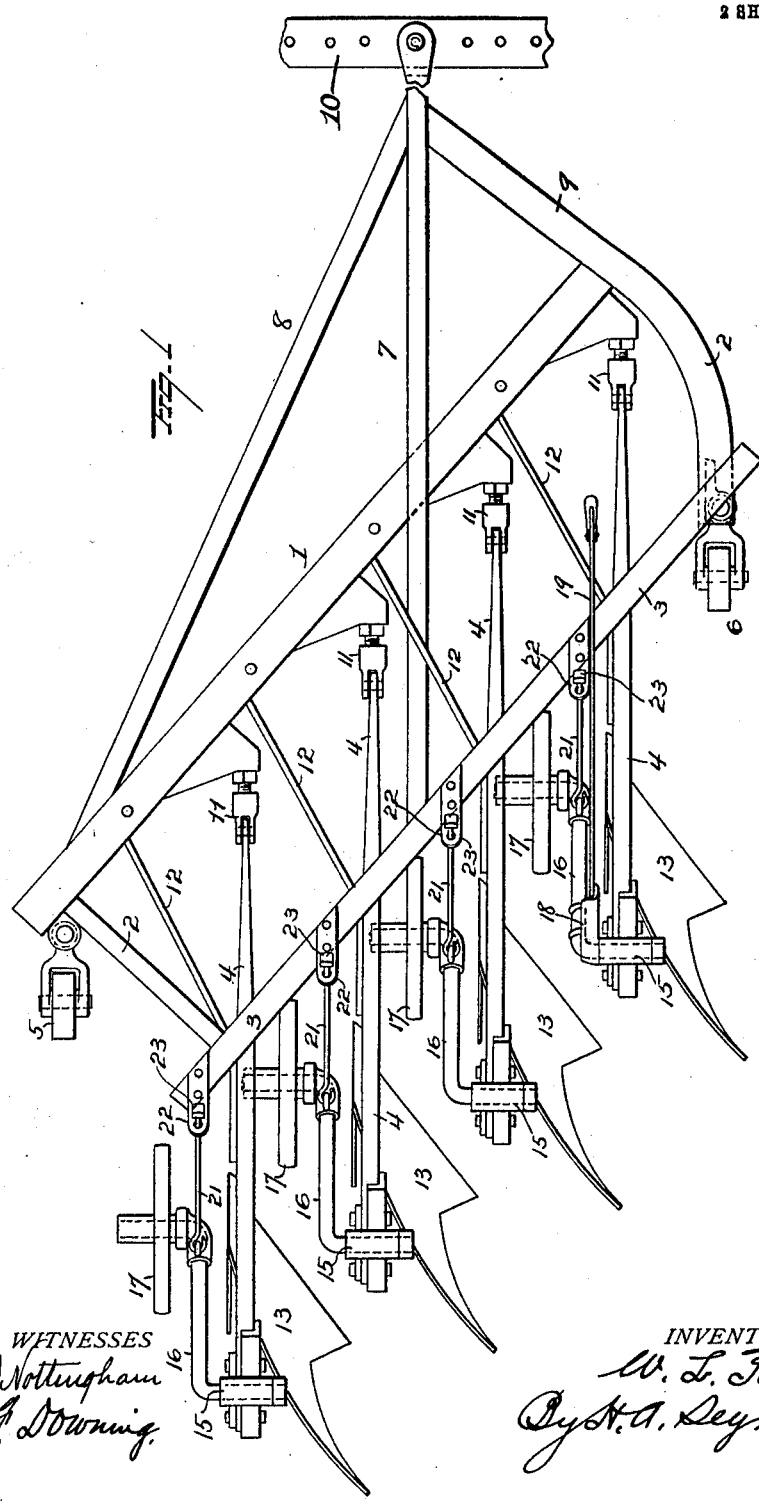

UNITED STATES PATENT OFFICE.

WILLIAM L. PAUL, OF SOUTH BEND, INDIANA, ASSIGNOR TO OLIVER CHILLED PLOW WORKS, OF SOUTH BEND, INDIANA.

PLOW.

1,004,463.  Specification of Letters Patent.  Patented Sept. 26, 1911.

Application filed June 11, 1910.  Serial No. 566,415.

*To all whom it may concern:*

Be it known that I, WILLIAM L. PAUL, of South Bend, in the county of St. Joseph and State of Indiana, have invented certain new and useful Improvements in Plows; and I do hereby declare the following to be a full, clear, and exact description of the invention, such as will enable others skilled in the art to which it appertains to make and use the same.

This invention relates to improvements in plows and more particularly to that type known in the art as engine gang plows,—one object of the invention being to so construct the machine as to facilitate turning of corners.

A further object is to provide simple and efficient means which can be operated to raise or lower the soil engaging members to regulate the depth of plowing and which can also be operated to so elevate the rear end of each plow beam as to raise the soil engaging members and also the raising means completely from the ground and thus facilitate the turning of the machine.

With these objects in view the invention consists in certain novel features of construction and combinations of parts as hereinafter set forth and pointed out in the claims.

In the accompanying drawings, Figure 1 is a plan view showing an embodiment of my invention, and Fig. 2 is a partial sectional view showing one of the plow beams and attached parts in elevation.

1 represents a truck frame which is diagonally disposed with respect to the line of draft of the machine and provided at respective ends with rearwardly projecting arms 2 for the reception of the respective ends of a beam (preferably an I beam) 3 which is disposed over the forward portions of plow beams 4. The truck frame is mounted on two wheels 5—6,—one of which is connected with one end of the forward portion of the truck frame and the other connected with the truck frame at the opposite end, adjacent to the connection of the beam 3 with one of the arms 2.

The truck frame is provided with a tongue 7 projecting forwardly therefrom parallel with the line of draft of the machine. This tongue is braced by members 8 and 9 which constitute portions of the truck frame and is connected at its forward end with the engine which is diagrammatically represented at 10.

The plow beams 4 are pivotally connected at their forward ends with the truck frame 1 forwardly of the beam 3 by means of suitable attaching devices 11 and brace arms 12. A soil engaging member 13 is connected with the rear end of each plow beam 4 by means of a standard 14 and upon the rear portion of each plow beam, a bearing 15 is provided for one member of an axle 16. Each axle 16 projects downwardly and forwardly from its bearing on the rear end of the plow beam and at the forward end, each axle is provided with a laterally projecting member, on which a wheel 17 is mounted. The parts are so proportioned and so disposed that the wheel 17 will be located laterally from the landside of the soil engaging member and engages the ground preferably in rear of the point of the soil engaging member. A bracket 18 is secured to each axle 16 and to each bracket a hand lever 19 is rigidly fastened. The lever 19 carries a suitable latch which coöperates with a toothed segment 20 secured to the plow beam 4. It is apparent that by operating the lever 19 in one direction or the other, the pressure of the wheel 17 upon the ground will be varied and the soil engaging member will be raised or lowered in accordance with the direction of movement of the lever 19 for the purpose of regulating the depth of plowing.

In order to facilitate the turning of the plow gang at a corner of a plot of ground being plowed, it is desirable to raise, not only the soil engaging member but also the lifting wheel 17, completely from the ground. For the accomplishment of this, the devices now to be described are employed. A rod 21 is loosely connected with each axle 16 a short distance rearwardly of the mounting of the wheel 17 thereon. This rod extends upwardly and forwardly from its connection with the axle 16 and passes freely through an opening in a lug 22 projecting rearwardly and upwardly from the I-beam 3, the upper forward end of said rod being provided with a head 23. During the normal operation of the lifting devices, the rod 21 will move freely through the lug 22 and the head 23 on said rod will be an appreciable distance above said lug. When the parts are in the position shown in Fig. 2, the soil engaging member will be nearly out of the ground. Further downward movement of the lever 19 will cause the head 23 of rod 21 to engage the lug 22 on the beam 3 and prevent further downward pressure of the wheel 17 against the ground. During the continued downward pressure upon the lever 19, a pulling action of the rod 21 on the beam 3 will result and consequently the rear end of the plow beam, the soil engaging member and the lifting wheel 17 will be raised completely from the ground.

Having fully described my invention what I claim as new and desire to secure by Letters-Patent, is:—

1. The combination with a truck, of a plow beam pivotally connected with said truck and provided at its rear end with a soil engaging member, a lifting wheel, means for operating said lifting wheel to raise or lower the soil engaging member, and means connecting said lifting wheel with the truck frame for causing the raising of the soil engaging member and lifting wheel completely from the ground by the operation of the lifting wheel operating means.

2. The combination with a truck frame and a plow beam pivotally connected at one end with the truck frame and provided at the other end with a soil engaging member, of an axle mounted near the rear end of the beam, a lifting wheel at the forward end of said axle, a lever secured to the axle for operating the same, and a rod connected at one end with said axle and movably connected with the truck frame.

3. The combination with a truck frame and a plow beam pivotally attached at one end thereto and provided at its other end with a soil engaging member, of an axle mounted near the rear end of the beam and provided with a downwardly and forwardly projecting member, a lifting wheel at the free end of said downwardly and forwardly projecting member of the axle, a hand lever secured to said axle, and a rod movably connected with the truck frame and provided at its upper end with a stop, the lower end of said rod being pivotally connected with the downwardly and forwardly projecting member of said axle.

4. The combination with a truck frame and a plow beam pivotally attached thereto, said truck frame having a member overhanging the plow beam, and a plow beam provided at its rear end with a soil eng... member, of an axle mounted near the rear end of the plow beam and provided with a downwardly and forwardly projecting member, a lifting wheel at the free end of said downwardly and forwardly projecting member of the axle, a hand lever secured to said axle, a segment with which said hand lever coöperates, and a rod movably connected with the truck frame and provided at its upper end with a stop, the lower end of said rod being connected with the downwardly and forwardly projecting member of said axle.

In testimony wherof, I have signed this specification in the presence of two subscribing witnesses.

WILLIAM L. PAUL.

Witnesses:
R. S. FERGUSON,
E. I. NOTTINGHAM.

Copies of this patent may be obtained for five cents each, by addressing the "Commissioner of Patents, Washington, D. C."